(12) United States Patent
Trossen

(10) Patent No.: US 6,904,140 B2
(45) Date of Patent: Jun. 7, 2005

(54) DYNAMIC USER STATE DEPENDENT PROCESSING

(75) Inventor: Dirk Trossen, Cambridge, MA (US)

(73) Assignee: Nokia Corporation, Espoo (FI)

( * ) Notice: Subject to any disclaimer, the term of this patent is extended or adjusted under 35 U.S.C. 154(b) by 162 days.

(21) Appl. No.: 10/320,636

(22) Filed: Dec. 17, 2002

(65) Prior Publication Data

US 2004/0114744 A1 Jun. 17, 2004

(51) Int. Cl.[7] .............................................. H04M 3/42
(52) U.S. Cl. ........................... 379/207.04; 379/201.02; 379/201.01
(58) Field of Search ...................... 379/201.01, 207.04, 379/210.01, 211.01, 201.02, 201.1

(56) References Cited

U.S. PATENT DOCUMENTS

| | | | | |
|---|---|---|---|---|
| 5,946,386 A | * | 8/1999 | Rogers et al. ......... | 379/265.09 |
| 6,185,288 B1 | * | 2/2001 | Wong ......................... | 379/219 |
| 6,195,424 B1 | * | 2/2001 | Young .................... | 379/211.01 |
| 6,463,145 B1 | * | 10/2002 | O'Neal et al. ......... | 379/211.02 |
| 2002/0097710 A1 | * | 7/2002 | Burg .......................... | 370/352 |
| 2003/0108176 A1 | * | 6/2003 | Kung et al. ............ | 379/211.02 |
| 2003/0112948 A1 | * | 6/2003 | Brown et al. .......... | 379/207.04 |
| 2003/0142807 A1 | * | 7/2003 | Dolan et al. ........... | 379/211.02 |
| 2003/0217109 A1 | * | 11/2003 | Ordille et al. .............. | 709/206 |

* cited by examiner

*Primary Examiner*—Ahmad F. Matar
*Assistant Examiner*—Hector Agdeppa
(74) *Attorney, Agent, or Firm*—Banner & Witcoff, LTD

(57) ABSTRACT

A communications network user may define multiple states. The state of the user is communicated to a call processing server. A set of instructions establishes various call processing options for incoming or outgoing calls received when the user is in one of the defined states. Upon receipt of a request to establish communication to or from the user, the call processing server processes the request as specified by the instructions in the instruction set that are mapped to the user's current state. The instructions may be in the form of a Call Processing Language (CPL) script, and may reside on a Session Initiation Protocol (SIP) compliant proxy server. The user state may be uploaded to the server in various manners.

40 Claims, 7 Drawing Sheets

```
         <cpl>
            <incoming>
80 ──▶   <state-switch>
82 ──▶     <state is "meeting">
84 ──▶       <location url="user10@voicemail.wxyz.com">
                <redirect />
             </location>
           </state>
86 ──▶     <state is "private">
88 ──▶       <address-switch field="origin">
90 ──▶         <address is "sip:spouse@abc.com">
                  <proxy />
               </address>
92 ──▶         <address is "sip:parents@def.com">
                  <proxy />
               </address>
94 ──▶         <address is "sip:friend@hij.com">
                  <proxy />
               </address>
96 ──▶         <address is "sip:customer@qrs.com">
                  <proxy />
               </address>
               <address is "sip:vendor@123co.com">
98 ──▶           <location url="assistant@wxyz.com">
                    <redirect />
                 </location>
               </address>
```

FIG. 4A

```
                <otherwise>
                    <location
url="user10@voicemail.wxyz.com">
                        <redirect />
                    </location>
                </otherwise>
            </address-switch>
        </state>
        <state is "home">
            <location
 url="user10@user10.homesipbox.com">
                <redirect />
            </location>
        </state>
        <otherwise>
            <proxy \>
        </otherwise>
    </state-switch>
</incoming>
</cpl>
```

FIG. 4B

```
120 ──────▶ <state is "WLAN">
122 ──────▶   <location url="wirelesslan@wxyz.com">
               <redirect />
             </location>
           </state>
124 ──────▶ <state is "3G">
             <location url="user10@3gprovider.com">
126 ──────▶
               <redirect />
             </location>
           </state>
128 ──────▶ <otherwise>
             <proxy \>
           </otherwise>
```

FIG. 7

DYNAMIC USER STATE DEPENDENT PROCESSING

FIELD OF THE INVENTION

This invention relates generally to telecommunications networks. More particularly, the invention concerns systems and methods for call processing based on a dynamically alterable state of a called or calling party.

BACKGROUND OF THE INVENTION

Internet telephony is becoming increasingly popular as a means to avoid the high cost of conventional wired-line telephone charges. It is also becoming popular due to additional features that may be provided over standard telephone usage, such as the availability of inexpensive multimedia sessions. Other features are also available due to the transfer of data in addition to voice messages, such as executing preferences in telephone software and call processing software. Further features may be provided through methods for initiating and processing call sessions.

Session Initiation Protocol (SIP) is a standard protocol for initiating an interactive user session involving multimedia elements such as video, games, voice, virtual reality and the like. As an example, SIP can establish and maintain Internet telephone calls. SIP provides application layer signaling that normally runs over User Datagram Protocol (UDP) or Transmission Control Protocol (TCP). The SIP standard is described further in the Internet Engineering Taskforce (IETF) RFC 3261, entitled "SIP: Session Initiation Protocol" and dated July 2002. As a request-response protocol, SIP accepts requests from clients and delivers responses from servers. Participants are identified by Universal Resource Identifiers (URIs). SIP establishes call parameters at either end of the communication session and handles call transfer and call termination.

Call processing languages may be used to tailor and adapt call control services to user preferences, and may be based on (or respond to) context information such as location, time, availability, or any other personal information. The Internet Engineering Task Force is currently standardizing a call processing language known as "CPL" that enables such call processing functionality (see IETF Internet Draft "draft-ietf-iptel-cpl-06.txt," which expired July 2002). CPL allows a party who is registered with a SIP proxy to establish various options and parameters for call processing. In some circumstances, the party would be a calling party (or "inviting" party in SIP), and thus placing an outgoing call through the SIP proxy. In other circumstances, the party could be a called party (or "invited" party), and may be receiving an incoming call through the SIP proxy. In either case, the call processing options would be described in a CPL script that is uploaded to the registering SIP proxy. The CPL script enables (among other functions) examination of fields in an incoming INVITE (directed to the party) or outgoing INVITE (originating from the party). As described in the above-referenced IETF RFC 3261, an INVITE message is issued by a calling party in order to set up an Internet telephone or other multimedia communication. A SIP proxy (which may host the calling party or the called party) may then parse the INVITE message and, based on instructions contained in a CPL script (such as described above), execute various call processing options determined by information included in the INVITE message. By examining different parameters, keywords and other information in an INVITE message, a party may thus have numerous available alternatives with regard to incoming and outgoing calls or other communications.

is generally difficult, however, to dynamically adapt CPL-defined call-processing rules to changing situations. For example, there may be some circumstances in which a party (when functioning as the called party) may only wish to accept calls from certain persons. The party may further wish to direct all other calls to voicemail or to an assistant. In other circumstances, the party may be willing to accept calls from a larger group.

One possible solution requires the party to upload a new CPL script to his or her hosting SIP proxy whenever he or she wishes to change how calls will be processed. This would require knowledge of CPL scripts in the party's SIP client device, as well as the ability to store and/or edit CPL scripts. However, CPL scripts can be fairly complex, and are often constructed with web-based tools on a desktop PC (or other computer with similar functionality), and not on a mobile phone or other client device with more limited functionality. Adding the ability to store, edit and upload CPL scripts could significantly increase the complexity and cost of a mobile device.

Another possible solution is to perform call processing within an application program running upon a SIP client. In the case of an incoming call, this would require completing the call before any action regarding the call could be taken. Among other disadvantages, this may tie up the called party's resources with calls that he or she seeks to avoid or to reroute for handling by other persons.

Yet another possible solution involves use of an external trusted third party call processing entity, as discussed in related U.S. patent application Ser. No. 09/995,568 entitled "External Trusted Party Call Processing In SIP Environments." As discussed therein, an "external-switch" element initiates a transfer of call processing from the executing SIP proxy to an URI specified as a parameter of the external-switch. The URI may correspond to an external trusted third party server, which proceeds with context-specific processing according to its programming. Through communication between the SIP client and the third party server, it would be possible to determine call processing based on the state of the called party (and indeed, realize solutions to even more complex problems). However, introduction of a third party server adds complexity to the SIP proxy due to the additional communication with the third party server.

Accordingly, a need remains for less complex solutions to the problem of determining call processing options based upon the state of a communication network user when acting as either a called or calling party.

SUMMARY OF THE INVENTION

The present invention allows a communication network user to define multiple states, and to establish call processing options for incoming or outgoing calls when in one of those states. A set of instructions, which may reside on a call processing server, maps multiple user states to various call processing options. Different instructions within the set of instructions invoke one or more of the processing options based on stored data that indicates the current state of the user. In one preferred embodiment, the server receives an indication of the current state of the user, and stores data indicating that current state. Upon receiving a request to establish a communication to or from the user, the server processes the request as specified by one or more call processing options mapped to the currently stored state. The server may then receive and store an indication of a new state of the user. Upon receiving a second request to establish a communication between the user and another party, the server processes the second request as specified by one or more call processing options mapped to the new state. In one preferred embodiment, the instructions are in Call Processing Language (CPL), and the server and user client are compliant with Session Initiation Protocol (SIP). Additional features and advantages of the invention are described below and in the drawings, and will be apparent from the description and drawings.

BRIEF DESCRIPTION OF THE DRAWINGS

FIGS. 4A & 4B are examples of a CPL script according to an embodiment of the invention.

FIG. 7 is an excerpt of a CPL script.

DETAILED DESCRIPTION OF THE INVENTION

The present invention addresses the problem of call processing that depends on the state of the user that is placing or (potentially) receiving calls through a server with which the user has registered. For example, if the user is in a meeting, he or she may want all incoming calls re-directed to his or her voicemail. If the user is not in a meeting and is slightly more willing to be disturbed, he or she may only want to take incoming calls from friends and family, and to route all other calls voicemail. If the user is at home, he or she may wish all incoming calls re-routed to a separate in-home communication system that is identified by a separate telephone number, IP address or other locater. The user may also wish to create state-dependent rules that take actions in addition to (or instead of) call rerouting. For example, incoming calls that are re-routed to voicemail could receive one message when the user is in a meeting, and another message when the user is in another state where he or she does not wish to be disturbed. The determination of the user's state could depend on an application currently active on the user's telephone, terminal or other client device. For instance, the meeting state of the user could be determined through an internal calendar database (or through an application which communicates with an external calendar system) where a user's meeting schedule is stored. User states could also be set manually on an ad hoc basis; could be defined in a profile (such as by setting a profile as is possible on certain mobile phones); or be set in other ways.

A user's state is likely to change dynamically, and it is therefore advantageous to have this state information readily available for call processing. In one preferred embodiment, the present invention enables state-dependent processing through an extension to Call Processing Language (CPL). This extension allows upload of state information to a call processing server and application of that state information to call processing by that server. The state information can be used for handling incoming as well as outgoing calls. Although the present invention is described by reference to an embodiment employing CPL scripts and the SIP protocol, other programming languages, protocols and data formats could be used. The invention could similarly be implemented in various hardware configurations. Any examples given are thus exemplary and not intended as limitations unless specifically recited as such in a claim.

Figure 1:
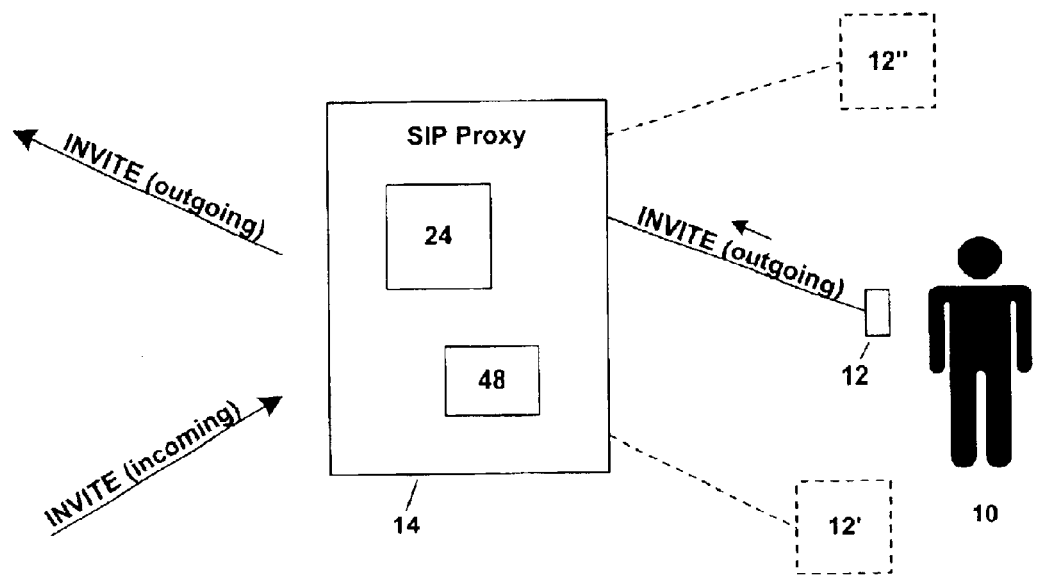
FIG. 1 shows an example of an architecture that supports a method for call processing in accordance with the present invention.

FIG. 1 shows one possible architecture in which the invention may be implemented. A user 10 of a communication system accesses the system through client device 12. Client device 12, which is SIP-compliant in one preferred embodiment, may be a mobile terminal (such as a handheld computer or mobile telephone), a desktop PC, a laptop computer, another server, etc. SIP proxy 14 hosts one or more client devices for user 10 (such as device 12), and receives and processes requests from user 10 via device 12 to make outgoing calls. Proxy 14 further receives and processes requests from other parties to make calls to user 10, and may connect such calls to device 12. Proxy 14 may also receive requests from user 10 via other devices, as well as establish communications to user 10 at other devices. For example, user 10 may inform proxy 14 (via a SIP REGISTER method, as described below) that he or she is currently using a different device for communication, and can be reached through that device. By way of illustration, device 12' in FIG. 1 may represent a desktop personal computer (PC) in an office of user 10, and device 12" may represent a home computer or some other device through which user 10 may wish to receive communications.

Figure 2:
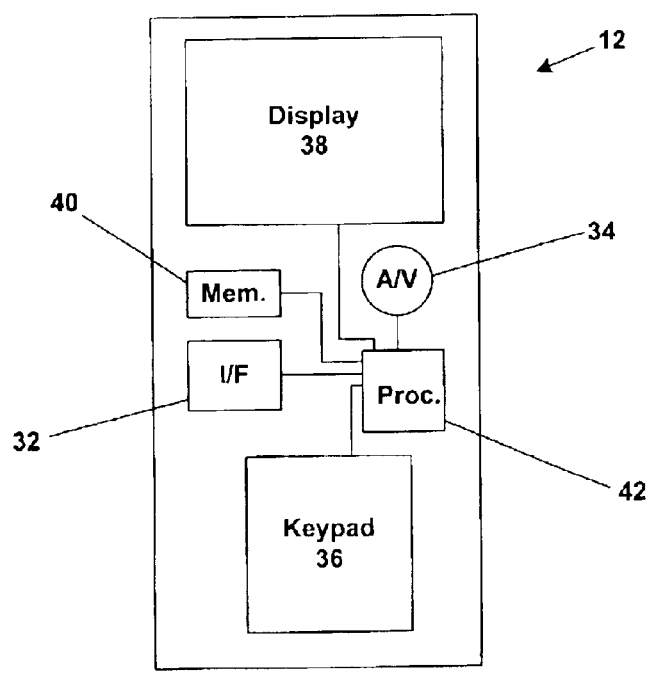
FIG. 2 is a functional diagram of a client device according to an embodiment of the present invention.

To initiate a call, user 10 may create an outgoing SIP INVITE message with device 12 (or other device such as 12' or 12") and transmit that message to proxy 14. Creation of the INVITE message may be automated, and may be initiated by the user dialing a phone number. As shown in FIG. 2, client device 12 generally includes a communications interface 32, inputs (e.g. keypad 36 and audio/visual inputs 34), display 38, memory 40, and processor 42. The communications interface 32 is adapted to communicate with proxy 14. In the case of a mobile device, interface 32 may include an RF link to a base station, which may in turn communicate with proxy 14 via intermediate network connections. In the case of a computer, interface 32 may be an Internet (or other network) connection. Stored within memory 40 are computer-executable instructions for receiving session initiation instructions, creating a session initiation message (such as an INVITE message), and transmitting the message to proxy 14.

Similarly, other parties seeking to establish a multimedia telephone call or other communication with user 10 initiate INVITE messages that are routed to proxy 14 (shown as an incoming INVITE message in FIG. 1). Such incoming invite messages may have been transmitted by another proxy (not shown) hosting the calling party's client device (also not shown), or may be initiated by other client devices hosted by proxy 14. Incoming INVITE messages are received by proxy 14 and processed in accordance with instructions from user 10 which have previously been prepared and stored on (or are otherwise available to) proxy 14.

Figure 3:
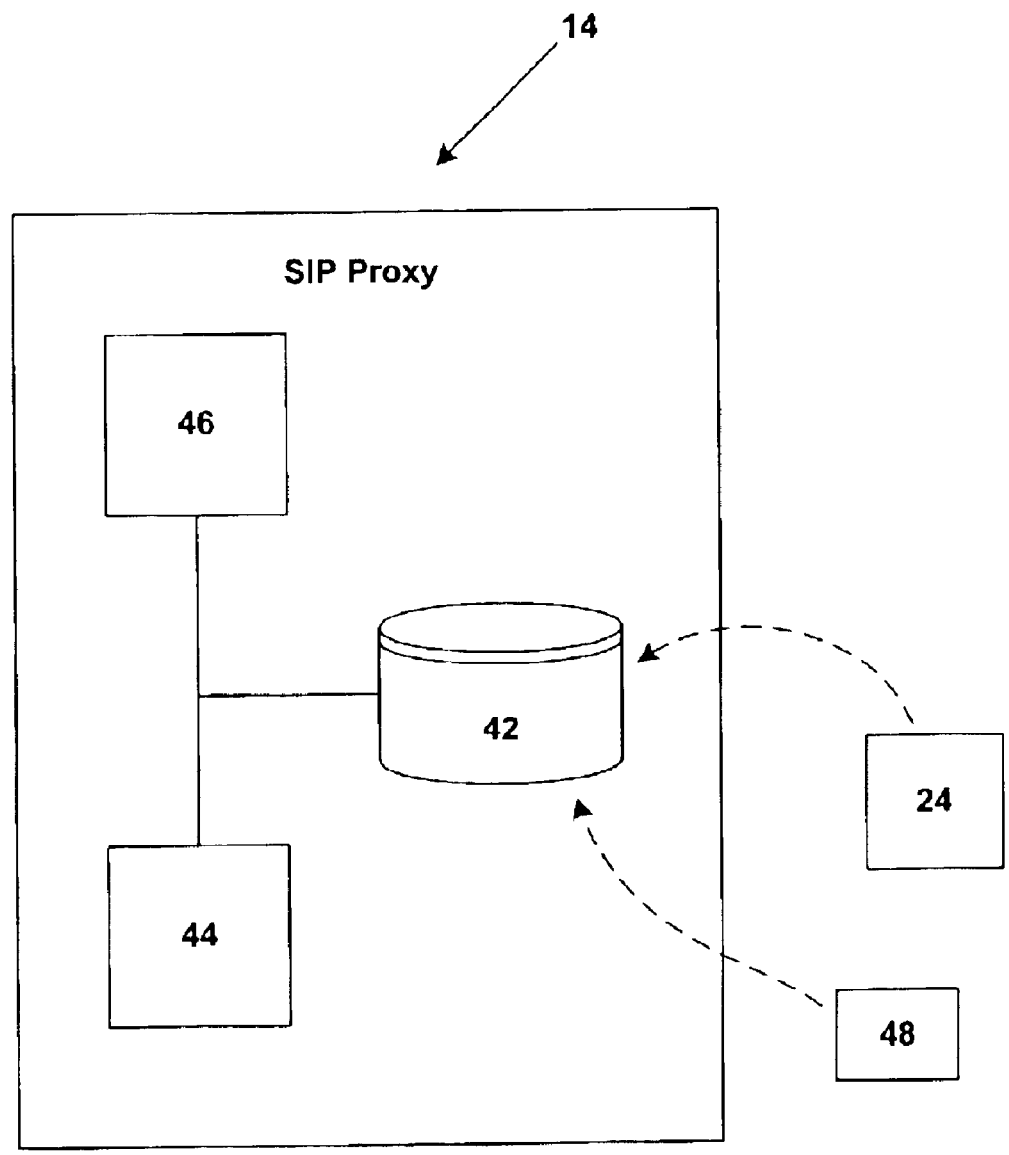
FIG. 3 is a functional diagram of a call processing server according to an embodiment of the invention.

As shown in FIG. 3, proxy 14 may include memory 42, a processor 46, and a communications interface 44 for communicating with user 10 (at, e.g., device 12, 12' or 12" in FIG. 1) and with other parties (not shown). Stored within memory 42 are computer-executable instructions for processing an outgoing SIP INVITE message from user 10, as well as incoming INVITE messages from other parties. According to one preferred embodiment as described in FIGS. 1–3, the instructions include a CPL script 24, which directs proxy 14 to perform various call-processing actions. Because CPL is based upon Extensible Markup Language (XML), an XML interpreter 48 is also stored in memory 42. XML interpreter 48 parses and executes the CPL script 24. Script 24 may be specific to user 10. In other embodiments, a single script may be used by a group of users.

Upon receiving an INVITE message, proxy 14 executes CPL script 24. Script 24 has previously been prepared by (or for) user 10 and uploaded to proxy 14. As described in the above-referenced IETF draft-ietf-iptel-cpl-06.txt, CPL scripts generally include a hierarchy of call processing actions, which include top-level actions and subactions. Top-level actions, such as initiating an outgoing call or processing an incoming call, are triggered by signaling events within an incoming message, such as an INVITE message, whereas subactions can be called from other actions. Upon receiving an outgoing SIP INVITE, proxy 14 executes an outgoing call action of CPL script 24. Conversely, proxy 14 executes an incoming call action of CPL script 24 upon receiving an incoming SIP INVITE.

In the embodiment of FIGS. 1–3, CPL script 24 contains definitions of various states for user 10. Included in those state definitions may be actions to be taken with regard to requests to establish a call or other communication between user 10 and another party. Such requests may originate with another party (in which case user 10 is the called party) or with user 10 (in which case user 10 is the calling party). In other words, the defined states may specify how incoming and/or outgoing INVITE messages will be treated when the user is in one of the defined states. So as to transmit this state to proxy 14, CPL may be extended with a language element that expresses the current state of user 10:

<state>
  "string"
</state> where "string" is a state of user 10. States could include "meeting," "home," "private," etc. The actual syntax could be varied, and any number of states could be defined. The state may also be defined independently for incoming and for outgoing calls by adding an additional parameter to the state definition:

<state mode=incoming>
  "string"
</state>

If mode=incoming, a given state ("string") is only defined for incoming calls. Conversely, if mode=outgoing, the state "string" would only be defined for outgoing calls. As an example of an outgoing state, the CPL script 24 for user 10 may define a state called "business." User 10 might invoke this state when he or she is making important business calls, and thus may have more stringent Quality of Service (QoS) or other requirements than when making personal calls. As another example, user 10 may have defined rules for outgoing calls when in a state called "personal," wherein the calls are re-routed to a SIP application server that hosts a calling-card based service. If the mode parameter were omitted, the state "string" could be applied to all (i.e., incoming and outgoing) calls.

The state of user 10 may be determined by logic within an application that is operating on device 12. For example, device 12 may have a calendar program on which meetings can be noted. During the time of such a meeting, device 12 may automatically change the state of user 10 to "meeting," "private" or some other state in which minimal interruptions will be allowed. Automatic (or manual) state changes by device 12 need not be time dependent, however. For example, device 12 may have the ability to determine its physical location, and be configured to change to certain states in certain locations. The state of user 10 may also be set by user 10 directly. For example, one or more of the keys on keypad 36 may be programmed to correspond to certain states. User 10 might press one key combination for a "do not disturb" state, another key combination for a "take all calls" state, etc. As yet another possibility, user 10 may have pre-defined certain states to correspond to his or her use of a particular client device. If device 12' (FIG. 1) is an office PC, for example, user 10 may have defined a state in which certain callers (e.g., important business contacts) will be given priority. If device 12" is a home computer, user 10 may have also defined a state in which certain family members and friends will be given priority, and other callers may be routed to voice mail.

User 10 may upload his or her state to proxy 14 in various ways. In one embodiment, the state is communicated as part of a REGISTER method in a SIP request. SIP requests and methods are described in the above-referenced IETF RFC 3261. A SIP client may issue a request containing the REGISTER method in order to inform a proxy or redirect server of the address at which a user can be reached. For example, user 10 might cause a first REGISTER method to be issued when he or she initially activates device 12, a second REGISTER method to be issued upon logging onto device 12', etc. REGISTER requests can also be used to install or change call handling features at a server. As an example of such a use, device 12 might issue a first REGISTER method when initially activated, and a subsequent REGISTER method upon user 10 pressing keys in keypad 36 to effect a change in state. The state of user 10 may be included in the message body of the request containing the REGISTER method, or as part of another field in the request. Upon receiving the request containing the REGISTER method, the XML interpreter 48 on proxy 14 parses the request for state keywords. Upon finding a state keyword, proxy 14 changes the state of user 10. In the embodiment of FIGS. 1–3, the state can be changed by storing a string corresponding to the new state in an appropriate location within memory 42 on proxy 14. A user state may also be uploaded to proxy 14 in other ways. For example, a state could be included as part of a SIP PUBLISH method. The PUBLISH method is described in "SIMPLE Presence Publication Mechanism," Internet Draft, draft-olson-simple-publish-01.txt, dated October 2002.

As another aspect of the present invention, CPL is also extended to include a state switch language element. Upon running a CPL script for user 10 in response to an incoming or outgoing call (such as an INVITE message as shown in FIG. 1), the state switch will cause proxy 14 to test for various states that may be stored for user 10 in memory 42. One example of possible language for a state switch language element is as follows:

Node: state-switch
Outputs: state
Parameter: none
Output: state
Parameter: is

As discussed below, the state-switch element obtains the current state of user 10 that is stored by proxy 14. The output from this element, the user's current state, is then tested against various string values within a script that correspond to different possible states. When the "state" output from the state-switch matches one of those strings (i.e., when the state "is" the same as one of those strings), call-processing actions that correspond to the matched string may be invoked.

FIGS. 4A and 4B are an example of a CPL script according to one embodiment of the invention, and which could be uploaded to proxy 14 by (or for) user 10. The script of FIGS. 4A–4B could be prepared in a web-based program, which might be accessed by user 10 over the Internet or by other means. Such a program could ask user 10 a series of questions about the types of states user 10 wishes to define, as well as information about desired call processing in each of those states. In response to those inquiries, the web-based program may automatically prepare script 24 for user 10. Alternatively, script 24 could be prepared on behalf of user 10 by a representative of the company providing communication services to user 10, or by other means. Script 24 is then loaded on SIP proxy 14 and appropriately coded such that incoming (or outgoing) calls for (or from) user 10 invoke script 24.

Figure 5:
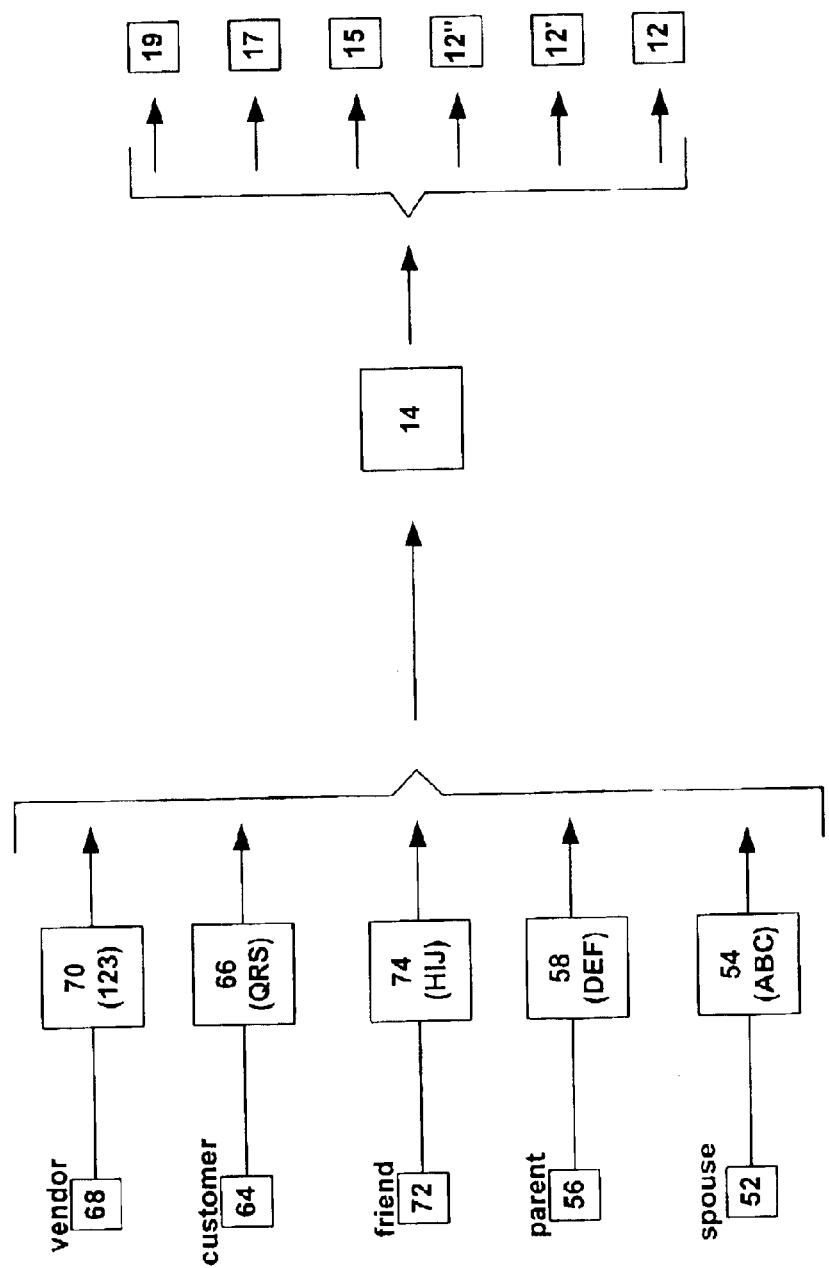
FIG. 5 is a block diagram of calling parties and a called party.

FIG. 5 is a block diagram showing potential incoming calls for user 10, as well as possible destinations for such calls. One potential source of calls for user 10 is from his or her spouse 52; spouse 52 and user 10 may or may not obtain communications services from the same provider. In FIG. 5, spouse 52 obtains communications services from "ABC", and is hosted by ABC proxy server 54. Parent 56 may also attempt to reach user 10; parent 56 obtains communications services through "DEF", and is hosted by DEF proxy server 58. Similarly, friend 72 obtains communications services from "HIJ", and is hosted by HIJ proxy server 74. A customer 64 of user 10 is hosted by proxy server 66 (provided by "QRS"), while an entity for which user 10 is a customer (vendor 68) is hosted by proxy server 70 provided by "123".

FIG. 5 also shows numerous possible destinations for incoming calls. In addition to client devices 12, 12' and 12", incoming calls to user 10 may be directed to voicemail 15 or to an administrative assistant 17 of user 10. Numerous other call routing and/or processing capabilities are possible, and are represented collectively by block 19.

FIGS. 4A and 4B, together with FIG. 5, further illustrate the operation of one preferred embodiment of the invention. In one example, user 10 may have previously set his state to "meeting." As seen under state switch 80 (FIG. 4A), user 10 has previously decided that all incoming calls will be redirected to his or her voicemail when user 10 is in a "meeting" state (tag 82). The uniform resource locator ("URL") for that voicemail is provided at location element 84. If user 10 receives a call from spouse 52, parent 56, friend 72, customer 64, vendor 68 or anyone else while in this state, the call will be directed to voicemail 15. Call processing rules for user 10's "private" state begin at state tag 86. Address switch 88 specifies that the origin address of an incoming INVITE message should be tested, and the call routed based upon the origin. As shown at address tag 90, user 10 has indicated that calls from his or her spouse should be forwarded through proxy 14. In this case, user 10 would receive a call from spouse 52 at the device (12, 12', 12" or other device) for which proxy 14 last received notification (via, e.g., a REGISTER method) that user 10 is using, or at which user 10 could be reached. Similarly, calls from parent (address tag 92), friend (address tag 94) or customer (address tag 96) could be routed by proxy 14 to the device that user 10 is currently using. However, user 10 may be less worried about immediately speaking to a party wishing to do business with user 10, and therefore not willing to directly route calls from vendor 68 to user 10. Instead, calls from vendor 68 (address tag 98) are routed to administrative assistant 17. As shown by the "otherwise" tag 100, all other calls are routed to voicemail 15. If the state of user 10 is "home" (tag 102), user 10 may wish to receive all calls. For example, user 10 may transmit a REGISTER method from his or her home computer 12" that contains a "home" state keyword, thereby invoking the "home" state. Upon receiving an incoming INVITE message, proxy 14 routes the call to user 10 at the URL location at tag 104. Finally, if user 10 has failed to invoke a state, "otherwise" tag 106 routes an incoming call to the device at which proxy 14 last received notification that user 10 is using the device.

Figure 6:
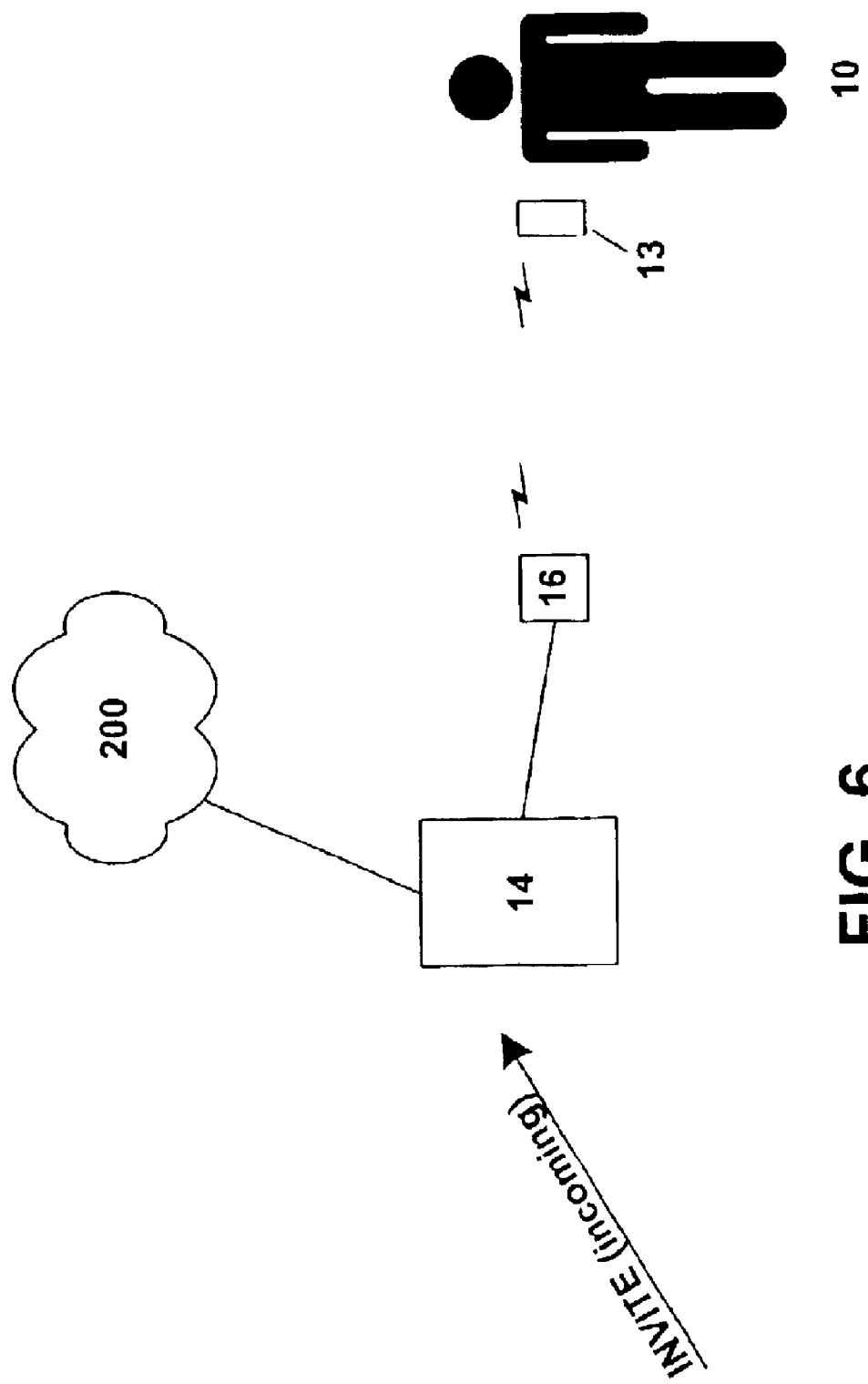
FIG. 6 is a block diagram illustrating additional call processing options.

State information for user 10 can also be used to direct incoming calls through a particular access network. As but one example, and as shown in FIG. 6, terminal 13 may have the capability to communicate via a cellular telephone network (such as, but not limited to, a Third Generation Mobile System, or "3G") as well as via a Wireless Local Area Network (Wireless LAN, or WLAN) radio interface. User 10 could therefore receive SIP-initiated calls on either interface. User 10 might desire, whenever possible, to receive incoming calls on the WLAN interface via wireless hub 16. Typically, such calls would be less expensive than calls received via 3G cellular network 200. If there is no WLAN connectivity available, however (e.g., the user is too far away from remote WLAN hub 16), user 10 may still receive calls using 3G connectivity. Accordingly, user 10 may define a state such as "WLAN." Upon upload of this state to proxy 14, calls to user 10 will be routed via WLAN hub 16. This state may be uploaded manually by user 10 (e.g., by pressing a particular combination of keys on terminal 13) or automatically uploaded (e.g., terminal 13 and/or hub 16 could detect the proximity of terminal 13 to hub 16 and upload a change in state). User 10 may also have a separate state such as "3G" and corresponding instructions (within a CPL script on proxy 14) to route calls via 3G network 200 when user 10 is in the "3G" state. FIG. 7 is an excerpt of a sample CPL script corresponding to FIG. 6. As shown under tag 120 ("state is "WLAN""), calls to user 10 are redirected to his or her WLAN provider account (tag 122) if in state "WLAN." If user 10 is in state "3G" (tag 124), all calls are redirected to his or her 3G account (tag 126). Finally, if user 10 has failed to invoke a state, "otherwise" tag 128 routes an incoming call to the device at which proxy 14 last received notification that user 10 is using the device.

Although specific examples of carrying out the invention have been described, those skilled in the art will appreciate that there are numerous variations and permutations of the above-described systems and methods that are involved in the spirit and scope of the invention as set forth in the appended claims. For example, a computer-readable medium could have computer-executable instructions stored thereon such that, when the instructions are read and executed by an appropriate device (or devices), steps of a method according to the invention are performed. Numerous other states and call processing options could be defined and/or combined. As but one example, certain states could be defined in which certain calling parties would be able to interrupt a call already in progress. Numerous other physical arrangements of calling and called parties are possible. Some or all calling parties could be hosted by the same proxy hosting a called party, and a called party may be hosted by more than one proxy. The functions of a proxy identified herein could be distributed across multiple platforms. As indicated above, other languages and protocols in addition to (or instead of) CPL and SIP may be implemented. Similarly, the format and syntax of CPL extensions described herein are only examples; other syntax and formats could be used. The various procedures and steps discussed above may be rearranged and their performance distributed across multiple hardware platforms and software applications. These and other modifications are within the scope of the invention as defined in the attached claims.

I claim:

1. A method for processing calls routed over a data communication network based on a state of a user, comprising:

receiving an indication of a first state of a user as part of a Session Initiation Protocol (SIP) request;

accessing a Call Processing Language (CPL) script providing instructions to a SIP compliant proxy server, the script defining a plurality of user states and mapping each state of the plurality to one or more call processing options;

identifying one of the user state definitions in the script matching the received indication;

processing call requests in accordance with the one or more options mapped to the identified state definition while the user is in the first state;

subsequently receiving an indication of a second state of the user as part of another SIP request;

subsequently identifying one of the user state definitions in the script matching the subsequently received indication; and processing call requests in accordance with the one or more options mapped to the subsequently identified state definition while the user is in the second state.

2. The method of claim 1, wherein the indications of user state are communicated as strings.

3. The method of claim 1, wherein at least one state of the plurality is independent of the time of a request to establish a communication between the user and another party.

4. The method of claim 1, wherein at least one state of the plurality is based on a location of the user.

5. The method of claim 1, wherein at least one state of the plurality is based on a client device through which the user is accessing a data communication network.

6. The method of claim 1, wherein at least one state of the plurality is mapped to at least one call processing option for calls initiated by the user.

7. The method of claim 1, wherein a first state of the plurality comprises communicating though a terminal via a wireless local area network (WLAN) and at least one call processing option mapped to the first state comprises redirecting to the WLAN a request to establish a communication with the user, and a second state of the plurality comprises communicating through the terminal via a cellular telephone network and at least one call processing option mapped to the second state comprises redirecting to the cellular network a request to establish a communication with the user.

8. The method of claim 1, wherein at least one call processing option mapped to a first state of the plurality and at least one call processing option mapped to a second state of the plurality each includes an identifier for at least one potential calling party, and the at least one call processing option mapped to the first state and the at least one call processing option mapped to the second state process call requests from the at least one potential calling party differently.

9. The method of claim 1, wherein at least one of the indications of the user state is received upon registration of a client device through which the user is accessing a data communication network.

10. The method of claim 1, wherein at least one of the indications of the user state is generated by an application software program operating upon a client device through which the user is accessing a data communication network.

11. The method of claim 10, wherein the application software program comprises a scheduling program executing on a mobile terminal.

12. The method of claim 1, wherein the script includes call processing options routing calls to different destinations based on user state.

13. The method of claim 1, wherein at least one of the call processing options comprises redirecting an incoming call request to a voice mail system, and at least one of the call processing options comprises redirecting to a third party a request to establish a communication with the user.

14. The method of claim 1, wherein the requests to establish communication each comprise a SIP INVITE message.

15. A computer-readable medium having computer-executable commands for performing steps related to processing calls routed over a data communication network, said processing based on a state of a user, and said steps comprising:

receiving an indication of a first state of a user as part of a Session Initiation Protocol (SIP) request;

accessing a Call Processing Language (CPL) script providing instructions to a SIP compliant proxy server, the script defining a plurality of user states and mapping each state of the plurality to one or more call processing options;

identifying one of the user state definitions in the script matching the received indication;

processing call requests in accordance with the one or more options mapped to the identified state definition while the user is in the first state;

subsequently receiving an indication of a second state of the user as part of another SIP request;

subsequently identifying one of the user state definitions in the script matching the subsequently received indication; and processing call requests in accordance with the one or more options mapped to the subsequently identified state definition while the user is in the second state.

16. The computer-readable medium of claim 15, wherein the indications of user state are communicated as strings.

17. The computer-readable medium of claim 15, wherein at least one state of the plurality is independent of the time of a request to establish a communication between the user and another party.

18. The computer-readable medium of claim 15, wherein at least one state of the plurality is based on a location of the user.

19. The computer-readable medium of claim 15, wherein at least one state of the plurality is based on a client device through which the user is accessing a data communication network.

20. The computer-readable medium of claim 15, wherein at least one state of the plurality is mapped to at least one call processing option for calls initiated by the user.

21. The computer-readable medium of claim 15, wherein
a first state of the plurality comprises communicating though a terminal via a wireless local area network (WLAN) and at least one call processing option mapped to the first state comprises redirecting to the WLAN a request to establish a communication with the user, and
a second state of the plurality comprises communicating through the terminal via a cellular telephone network and at least one call processing option mapped to the second state comprises redirecting to the cellular network a request to establish a communication with the user.

22. The computer-readable medium of claim 15, wherein
at least one call processing option mapped to a first state of the plurality and at least one call processing option mapped to a second state of the plurality each includes an identifier for at least one potential calling party, and
the at least one call processing option mapped to the first state and the at least one call processing option mapped to the second state process call requests from the at least one potential calling party differently.

23. The computer-readable medium of claim 15, wherein at least one of the indications of the user state is received upon registration of a client device through which the user is accessing a data communication network.

24. The computer-readable medium of claim 15, wherein at least one of the indications of the user state is generated by an application software program operating upon a client device through which the user is accessing a data communication network.

25. The computer-readable medium of claim 24, wherein the application software program comprises a scheduling program executing on a mobile terminal.

26. The computer-readable medium of claim 15, wherein the script includes call processing options routing calls to different destinations based on user state.

27. The computer-readable medium of claim 15, wherein
at least one of the call processing options comprises redirecting an incoming call request to a voice mail system, and
at least one of the call processing options comprises redirecting to a third party a request to establish a communication with the user.

28. The computer-readable medium of claim 15, wherein the requests to establish communication each comprise a SIP INVITE message.

29. A call processing server, comprising:
a memory;
a data communication network interface; and
a processor configured to execute commands for:
receiving via the interface an indication of a first state of a user as part of a Session Initiation Protocol (SIP) request,
accessing a Call Processing Language (CPL) script stored in the memory, said script providing instructions to a SIP compliant proxy server, defining a plurality of user states, and mapping each state of the plurality to one or more call processing options,
identifying one of the user state definitions in the script matching the received indication,
processing call requests in accordance with the one or more options mapped to the identified state definition while the user is in the first state,
subsequently receiving via the interface an indication of a second state of the user as part of another SIP request,
subsequently identifying one of the user state definitions in the script matching the subsequently received indication, and
processing call requests in accordance with the one or more options mapped to the subsequently identified state definition while the user is in the second state.

30. The call processing server of claim 29, wherein
a first state of the plurality comprises communicating though a terminal via a wireless local area network (WLAN) and at least one call processing option mapped to the first state comprises redirecting to the WLAN a request to establish a communication with the user, and
a second state of the plurality comprises communicating through the terminal via a cellular telephone network and at least one call processing option mapped to the second state comprises redirecting to the cellular network a request to establish a communication with the user.

31. The call processing server of claim 29, wherein the processor is further configured to execute commands for receiving at least one of the indications of the user state upon registration of a client device through which the user is communicating.

32. The call processing server of claim 29, wherein the processor is further configured to execute commands for receiving at least one of the indications of the user state generated by an application software program operating upon a client device through which the user is communicating.

33. The call processing server of claim 32, wherein the application software program comprises a scheduling program executing on a mobile terminal.

34. The call processing server of claim 29, wherein the script includes call processing options routing calls to different destinations based on user state.

35. The call processing server of claim 29, wherein
at least one of the call processing options comprises redirecting an incoming call request to a voice mail system, and
at least one of the call processing options comprises redirecting to a third party a request to establish a communication with the user.

36. A communications terminal for participating in Internet calls and adapted to receive Internet calls initiated with a Session Initiation Protocol (SIP) request, said terminal comprising:
a communications interface adapted to communicate with a SIP-compliant proxy, the proxy having a Call Processing Language (CPL) script providing instructions to the proxy, defining a plurality of user states and mapping each state of the plurality to one or more call processing options; and
a processor configured to perform steps including
receiving an indication the user state,
transmitting to the SIP-compliant proxy an indication the user is in a first state matching one of the definitions in the CPL script, the first state corresponding to instructions by which the proxy will establish communication between the user and a first party and not establish communication between the user and a second party,
receiving an indication the user is in another state, and transmitting to the SIP-compliant proxy an indication the user is in a second state matching another of the definitions in the CPL script, the second state corresponding to instructions by which the proxy will not establish communications between the user and the first or second party.

37. The communications terminal of claim 36, wherein the processor is further configured to receive an indication of the user state from an application software program operating upon the mobile communications terminal.

38. The communications terminal of claim 36, wherein the processor is further configured to transmit an indication of user state in a SIP request containing the REGISTER method.

39. The communications terminal of claim 36, wherein the processor is further configured to transmit an indication of user state in a SIP request containing the PUBLISH method.

40. A method for processing calls at a Session Initiation Protocol (SIP) compliant proxy based on user state, comprising:

identifying a Call Processing Language (CPL) script comprising a set of instructions that map multiple user states to a plurality of call processing options, the set of instructions:
  invoking one or more of the options based on stored data indicating the current state of a user, the stored data being alterable without modification of the script,
  including identifiers for a plurality of potential calling and called parties,
  including instructions that, as to at least one potential calling or called party, invoke different call processing options for different user states, and
  including instructions to route calls to one of a plurality of destinations based on user state;

receiving, via a string in a SIP request message registering a client device through which the user is communicating, an indication of the current state of the user;

storing data indicating the current state of the user;

receiving a first incoming INVITE message seeking to establish a communication between the user and another party;

processing the first INVITE message as specified by one or more call processing options mapped to the current state of the user;

receiving, via a string in another SIP request message, an indication of a new state of the user;

storing data indicating the new state of the user;

receiving a second incoming INVITE message seeking to establish a communication between the user and another party;

processing the second INVITE message as specified by one or more call processing options mapped to the new state of the user;

receiving, via a string in another SIP request message, an indication of an outgoing call state of the user;

receiving an outgoing INVITE message seeking to establish a communication between the user and another party; and processing the outgoing INVITE message as specified by one or more call processing options mapped to the outgoing call state.

* * * * *

UNITED STATES PATENT AND TRADEMARK OFFICE
CERTIFICATE OF CORRECTION

PATENT NO. : 6,904,140 B2
DATED : June 7, 2005
INVENTOR(S) : Dirk Trossen

It is certified that error appears in the above-identified patent and that said Letters Patent is hereby corrected as shown below:

Title page,
Item [56], References Cited, U.S. PATENT DOCUMENTS, insert the following:
-- 6,005,870    12/1999    Leung et al.
   6,373,817    04/2002    kung et al. --.
OTHER PUBLICATIONS, insert the following:
-- Lennox et al., "CPL; A Language for User Control of Internet Telephony Services," January 15, 2002.
J. Rosenberg et al., "SIP: Session Initiation Protocol," June 2002
J. Lennox, H. Schulzrinne, "Call Processiong Language Framework and Requirments, May 2000
B. Campbell et al., "SIMPLE Presence Publication Mechanism," October 24, 2002 --.

Signed and Sealed this

Fourth Day of April, 2006

JON W. DUDAS
*Director of the United States Patent and Trademark Office*